United States Patent [19]

Matsuoka

[11] Patent Number: 5,014,664
[45] Date of Patent: May 14, 1991

[54] HEAT-INSULATING STRUCTURE OF SWIRL CHAMBER

[75] Inventor: Hiroshi Matsuoka, Yamato, Japan

[73] Assignee: Isuzu Motors Limited, Tokyo, Japan

[21] Appl. No.: 558,374

[22] Filed: Jul. 27, 1990

[30] Foreign Application Priority Data

Jul. 27, 1989 [JP] Japan ................................. 1-192590

[51] Int. Cl.⁵ ........................ F02B 19/08; F02B 19/16
[52] U.S. Cl. .................................... 123/271; 123/254; 29/888.061
[58] Field of Search ............... 123/254, 269, 270, 271, 123/668, 669; 29/888.06, 888.061

[56] References Cited

U.S. PATENT DOCUMENTS

| | | | |
|---|---|---|---|
| 4,511,612 | 4/1985 | Hüther et al. | 123/270 X |
| 4,616,611 | 10/1986 | Ogawa et al. | 123/270 |
| 4,676,207 | 6/1987 | Kawamura et al. | 123/271 |
| 4,681,074 | 7/1987 | Ogawa et al. | 123/271 |
| 4,699,102 | 10/1987 | Taniguchi | 123/271 |
| 4,834,042 | 5/1989 | Wakasa et al. | 123/271 |
| 4,844,037 | 7/1989 | Miyakawa et al. | 123/270 |
| 4,875,939 | 10/1989 | Miyakawa et al. | 123/271 |

FOREIGN PATENT DOCUMENTS

| | | | |
|---|---|---|---|
| 0188024 | 10/1984 | Japan | 123/271 |
| 0030421 | 2/1985 | Japan | 123/270 |
| 61-83451 | 4/1986 | Japan . | |
| 63-87226 | 6/1988 | Japan . | |
| 2055965 | 3/1981 | United Kingdom . | |

OTHER PUBLICATIONS

"Manufacturing Method of Subchamber for Engine" Patent Abstract of Japan, vol. 10, No. 257 (M-513) (2313) Sep. 3, 1986 & JP-A-61 83451 (Mazda Motor Corp) Apr. 28, 1986.

"Manufacturing Method of Engine Subchamber" Patent Abstracts of Japan, vol. 10, No. 270 (M-517) (2326) Sep. 13, 1986 & JP-A-61 93227 (Mazda Motor Corp.) May 12, 1986.

Primary Examiner—Willis R. Wolfe
Attorney, Agent, or Firm—Browdy and Neimark

[57] ABSTRACT

A heat-insulating structure of a swirl chamber of this invention comprises ceramic swirl chamber blocks for forming swirl chambers, heat-insulating layers disposed outside the swirl chamber blocks and reducing the heat-insulating degree of the portions of the swirl chamber blocks, at which a temperature becomes high, much more than at other portions, and metallic outer blocks disposed by casting to the outer surface of the heat-insulating layers and the exposed outer surfaces of the swirl chamber blocks. Accordingly, a high heat-insulating structure of a swirl chamber can be obtained even when the swirl chamber blocks are not made of a material having a low thermal transfer rate, and the temperature distribution of the swirl chamber block can be freely controlled to the optimum condition. Moreover, compressive force is imparted to the swirl chamber blocks by shrinkage at the time of cooling of the outer blocks so as to secure the strength of the swirl chamber blocks. Particularly, the compressive force acting on the swirl chamber blocks as a whole is regulated by increasing the thickness of the portions of the swirl chamber blocks, on which the excessive compressive force acts, or reducing the density of the heat-insulating layers so as to secure the strength of the swirl chamber blocks.

10 Claims, 2 Drawing Sheets

HEAT-INSULATING STRUCTURE OF SWIRL CHAMBER

BACKGROUND OF THE INVENTION

1. Field of the Invention:

This invention relates to a heat-insulating structure of a swirl chamber in an internal combustion chamber.

2. Description of the Prior Art:

Generally, in combustion chambers of a swirl chamber type in an internal combustion engine, mixing of a fuel and air is made twice each in a swirl chamber and main combustion chamber and the mixing state is better than in those of a direct injection type. However, the loss of cooling water is greater with the swirl chamber type than with the direct injection type and the fuel efficiency becomes lower. Therefore, attempts have been made to constitute the swirl chamber in a heat-insulating structure in order to minimize the loss of cooling water.

However, in the case of the heat-insulating structure wherein the outer surface of the swirl chamber is heat-insulated uniformly, cracks, breakage, etc., of the swirl chamber occur due to thermal stress resulting from temperature difference that occurs in the swirl chamber. Thus, the problem of durability of the swirl chamber arises. The temperature distribution on the inner wall surface constituting the swirl chamber is such that the temperature becomes high particularly at jet port formation portions of jet ports communicating from the main combustion chamber to the swirl chamber, and the temperature distribution around the jet port portion provides high temperature particularly at the jet port portion on the center side of the main combustion chamber. Accordingly, the temperature distribution around the jet port formation portions of the swirl chamber block is different to some extents when the swirl chamber block for constituting the inner wall portion of the swirl chamber is made of a ceramic material and a thermal stress occurs. This thermal stress exerts adverse influences on the strength of the ceramic material and poses a durability problem. For this reason, a problem remains to be solved as to how the swirl chamber itself be constituted in order to improve durability of the swirl chamber block.

A production method of a swirl chamber of an engine is known in the past from Japanese Patent Laid-Open No. 83451/1986, for example. The production method of the swirl chamber of the engine disclosed in this prior art reference fits an outer cylinder of an iron type sintered material which is subjected to compression powder molding or preparatory sintering on an inner cylinder made of ceramic and then couples the inner and outer cylinders integrally by regular sintering to produce the swirl chamber of the engine. Namely, an insert member is prepared by integrating ceramic particles by use of a copper type bonding material and molding the integrated member in a shape substantially equal to the shape of a heat-insulating chamber to be formed in a predetermined position between the inner and outer cylinders described above, and after this insert member is interposed to the predetermined position between the inner and outer cylinders, the regular sintering step is carried out.

In the production method of the swirl chamber of the engine described above, the outer peripheral metal material consists of the sintered material. Therefore, the sintered metal has the function of only sealing the heat-insulating layer but cannot control the compressive force or the heat-insulating degree. In other words, this production method does not have the technical concept of improving durability of the inner cylinder made of the ceramic material.

A swirl chamber structure of a Diesel engine is disclosed in Japanese Utility Model Laid-Open No. 87226/1988, for example. This swirl chamber structure of the Diesel engine constitutes the swirl chamber by burying a shell-like member and a hot plug into the cylinder head or the cylinder block. In this swirl chamber structure of the engine, the shell-like member and the hot plug are composed of a heat-resistant steel, and a porous ceramic layer is formed by spraying on the outer surfaces of both, or either one, of these members and they are buried into the cylinder head or the cylinder block so as to constitute the swirl chamber.

In the swirl chamber structure of the Diesel engine described above, the block constituting the swirl chamber is made of a metallic material and the ceramic layer is disposed on the outer peripheral portion of this block. In other words, the block itself is not constituted by the ceramic layer and this prior art technique lacks the technical concept of improving durability of this block.

When the block constituting the swirl chamber is directly casted into the large member such as the cylinder head as is made in the prior art technique, deviation of the dimension at the time of casting becomes excessively great and such a product cannot be employed as the product. The deviation of the cast dimension must be about ±1.5 mm for the size of about 500 mm but accuracy of position dimension of the swirl chamber must be about ±0.2 mm.

Residual compressive stress cannot be applied to the ceramic material by shrinkage fit of the metallic material to the ceramic material because the application direction of the compressive stress is unidirectional. Thus, the effective residual compressive stress cannot be applied to the ceramic material.

SUMMARY OF THE INVENTION

The primary object of the present invention is to solve the problem described above. In an internal combustion engine including a cylinder block having formed therein cylinders, a cylinder head fixed to the cylinder block and equipped with hole portions formed in such a manner as to correspond to the cylinders for forming swirl chambers and main combustion chambers formed inside the cylinders of the cylinder block, the present invention provides a heat-insulating structure of a swirl chamber which comprises swirl chamber blocks made of a ceramic material and having formed therein the swirl chambers and jet ports for establishing communication between the swirl chambers and the main combustion chambers; heat-insulating layers made of a ceramic material and disposed on the outer surface of the swirl chamber blocks, the heat-insulating layers reducing the heat-insulating degree at high temperature portions of the swirl chambers much more than at low temperature portions thereof; and outer blocks made of a metal and fixed by casting to the outer surfaces of the heat-insulating layers and the exposed outer surfaces of the swirl chamber blocks.

Accordingly, in this heat-insulating structure of a swirl chamber, the heat-insulating property is improved by controlling the heat-insulating degree by the heat-insulating layers outside the swirl chamber blocks, thereby controlling also the temperature of the swirl chamber blocks so as to reduce the occurrence of the thermal stress, and the strength of the swirl chamber blocks is secured by controlling the compressive force of the residual compressive stress occurring in the swirl chamber blocks by casting the metallic outer blocks It is another object of the present invention to provide a heat-insulating structure of a swirl chamber which can withstand a high temperature combustion gas by forming the inner wall portion of the swirl chamber, which is exposed to the combustion gas, by a ceramic material having high heat resistance and high thermal shock resistance, such as silicon nitride, aluminum titanate, or the like, in consideration of the fact that the jet port portions of the swirl chamber having the heat-insulating structure are the portions which should meet severe strength requirement caused by thermal stress and mechanical stress and at which the temperature becomes high; improves the heat-insulating degree of the swirl chamber by disposing particularly the heat-insulating layers between the swirl chamber blocks made of a ceramic material having high temperature resistance and high strength and the outer blocks made of the metallic material; controls the heat-insulating property by optimally selecting the thicknesses and locations of the heat-insulating layers so as to change quantity of heat radiated from the swirl chamber blocks to the cylinder head side; particularly reduces the heat-insulating degree at the jet port portions of the swirl chambers which become high temperature regions so as to mitigate heat accumulation, to cause heat radiation and to make the temperature distribution uniform not only at the entire circumferential portions of the jet port portions of the swirl chambers but also throughout the swirl chamber blocks as a whole; and thus can reduce the thermal stress acting on the swirl chamber blocks due to the temperature difference.

It is still another object of the present invention to provide a heat-insulating structure of a swirl chamber which imparts residual compressive stress to the predetermined portions of the swirl chamber blocks as a result of compressive force to a metallic material generated as much as the difference of thermal shrinkage between the metallic material and a ceramic material which shrinkage difference occurs at the time of cooling of the metallic material that is casted to the outer surface of the swirl chamber blocks, so that the resulting residual compressive stress occurring in the swirl chamber blocks acts to offset various kinds of stresses, particularly the tensile strength, occurring at the time of driving of the engine, so as to secure the strength of the swirl chamber blocks; optimally selects the thicknesses of the heat-insulating layers and their locations so as to control the residual compressive stress; reduces the heat-insulating degree of those portions of the swirl chambers such as the jet port portions at which the temperature becomes high, so as to mitigate thermal accumulation, to cause thermal radiation and to make the temperature distribution uniform not only at the entire circumferential portions of the jet port portions of the swirl chamber blocks but also throughout the swirl chamber blocks as a whole; and prevents the occurrence of the thermal stress, improves durability by increasing the strength of each swirl chamber block itself and prevents the occurrence of damage to the swirl chamber block such as crack and breakage.

It is still another object of the present invention to provide a heat-insulating structure of a swirl chamber which can regulate the heat-insulating degree of each swirl chamber by the set value of the thickness and location of the heat-insulating layer. In other words, the temperature distribution of the swirl chamber block can be controlled to an optimum state or uniformly by selecting optimally the thick and thin portions of the heat-insulating layer disposed on the outer surface of the swirl chamber block, the portions where the heat-insulating layer does not exist, or the density of the heat-insulating layer. In this manner, the thermal stress occurring in the swirl chamber block can be reduced, the occurrence of damage such as cracks and breakage of the swirl chamber block can be prevented and durability of the swirl chamber can thus be improved.

It is still another object of the present invention to provide a heat-insulating structure of a swirl chamber which fits the outer block described above into the hole portion formed in the cylinder head in such a manner as to define an air layer between them, and fits and fixes the flange portion described above into the inlet portion of the hole portion. Accordingly, unlike the prior art technique in which the block constituting the swirl chamber is directly casted into a large member such as the cylinder head, deviation of the dimension does not become excessive at the time of casting and quality of the product becomes highly reliable.

DETAILED DESCRIPTION OF THE EMBODIMENTS

Figure 1:
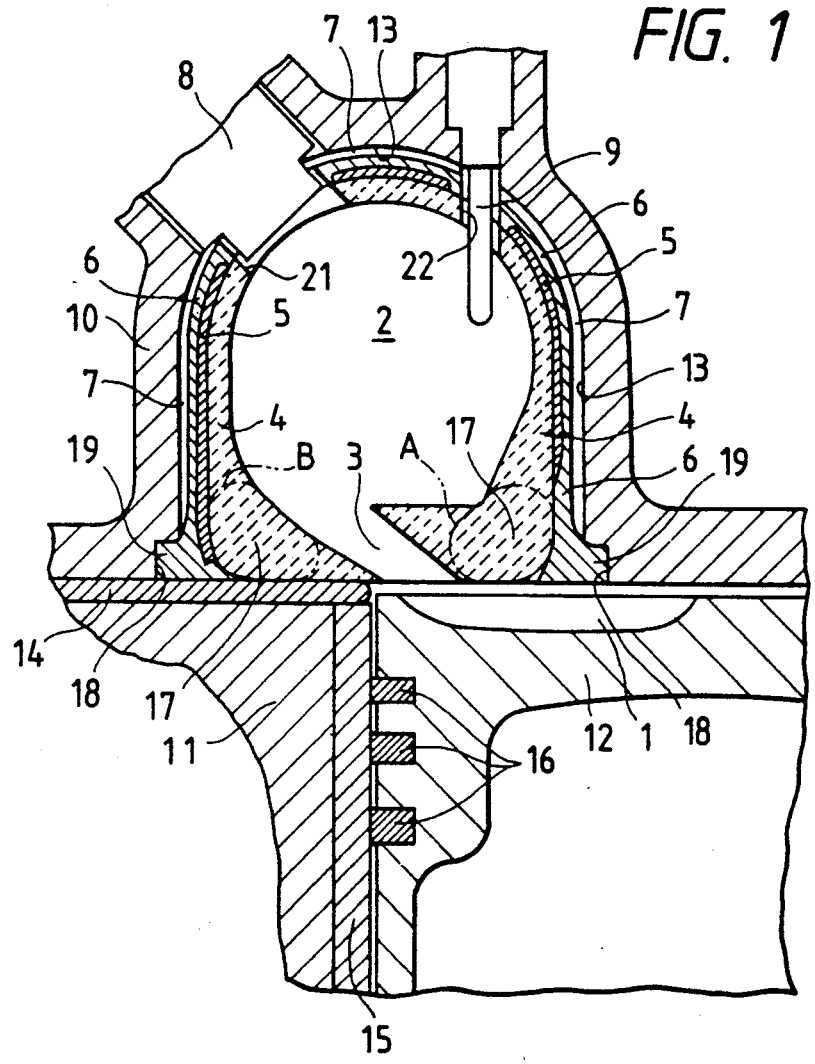
FIG. 1 is a sectional view showing a heat-insulating structure of a swirl chamber in accordance with one embodiment of the present invention.

Hereinafter, preferred embodiments of the heat-insulating structure of a swirl chamber in accordance with the present invention will be explained in detail with reference to the accompanying drawings FIG. 1 shows the heat-insulating structure of the swirl chamber in accordance with one embodiment of the present invention.

The internal combustion engine incorporating the heat-insulating structure of the swirl chamber includes primarily a cylinder block 11 in which cylinders are formed, a cylinder head 10 fixed to the cylinder blocks 11 and equipped with hole portions 13 for forming the swirl chambers 2 and formed corresponding to the cylinders and main combustion chambers 1 formed inside the cylinders of the cylinder block 11. More particularly, the cylinder head 10 is fixed to the cylinder block 11 through a head gasket 14. A cylinder liner 15 for constituting each cylinder is fitted to each of the hole portions formed in the cylinder block 11. These hole portions 13 are formed in the cylinder head 13 in the number corresponding to the number of cylinders and outer blocks 6 are fitted and fixed to the hole portions 13 in such a manner as to define an air layer 7. A piston 12 having fitted thereto a piston ring 16 is fitted into each cylinder liner 15 in such a manner as to be capable of reciprocation. A fuel injection nozzle 8 for atomizing a fuel into the swirl chamber 2, fitting hole 21 of the swirl chamber block 4 and a glow plug 9 for igniting and burning the atomized fuel, fitted into the fitting hole 22, are disposed in the swirl chamber 2.

Though not shown in the drawing, intake and exhaust ports are formed in the cylinder head 10 in such a manner as to correspond to the cylinders, respectively. A valve seat is formed on the lower surface portion of the cylinder head 10 and intake and exhaust valves for opening and closing the intake and exhaust valves are disposed on the respective valve seats. It is possible in some cases to employ the structure wherein the intake port is formed at the lower part of the cylinder liner 15.

In the heat-insulating structure of the swirl chamber in accordance with the present invention, the swirl chamber block 4 which allows the swirl chamber 2 to communicate with the main combustion chamber 1 through the jet port 3 and defines the swirl chamber 2 is made of a ceramic material such as silicon nitride ($Si_3N_4$) or silicon carbide (SiC), the heat-insulating layer 5 is disposed on the external side of this swirl chamber block 4 and furthermore, an external block 6 made of a metal is disposed on the outer surface of the heat-insulating layer 5 and on the exposed outer surface of the swirl chamber block 4 by casting. This heat-insulating structure of the swirl chamber is directed to control the degree of heat insulation and the residual compressive stress by disposing the heat-insulating structure on the external side of the swirl chamber block 4 constituting the swirl chamber 2 by casing the metal. To accomplish this object, the heat-insulating structure of this invention is characterized in that the heat-insulating layer 5 functioning as a stress mitigation layer and made of ceramic power or a porous ceramic material such as ceramic whiskers is disposed between the swirl chamber block 4 and the casted metal block, that is, the outer block 6, when the ceramic swirl chamber block 4 is constituted in a unitary structure by casting the metal.

Each swirl chamber block 4 is made of a ceramic material having high heat resistance and high strength such as silicon nitride ($Si_3N_4$), silicon carbide (SiC), aluminum titanate, or the like. These ceramic materials have generally a high heat transfer rate but a low adiabatic property. In order to improve the heat-insulating property of the swirl chamber 2, therefore, the heat-insulating layer 5 is disposed outside the swirl chamber block 4. This heat-insulating layer 5 consists of a heat-insulating material such as ceramic whiskers, ceramic powder, etc., made of silicon nitride, aluminum titanate, potassium titanate, etc., and has a porous structure. Furthermore, in order to secure the strength of the swirl chamber block 4, the outer block 6 is casted into the swirl chamber block 4 to provide it in advance with the residual compressive stress. This outer block 6 is made of a metallic material such as aluminum (Al), cast iron (Fc), Ni-resist (Ni-Resist), or the like.

The heat-insulating layer 5 disposed between the swirl chamber block 4 and the outer block 6 has the function of the stress mitigation material besides its heat-insulating function. The thickness of this heat-insulating layer 5 is reduced or the heat-insulating layer 5 itself is not disposed in order to make uniform the temperature distribution of the swirl chamber block 4 and to make the heat-insulating degree at the high temperature portion (represented by symbol A) of the swirl chamber 4 lower than at other portions. In other words, the region of the swirl block 4 represented by symbol A is positioned on the center side of the main combustion chamber 1 and is the portion which receives serverer thermal influences than the other portions of the swirl chamber block 4 and on which excessive compressive force acts locally.

The heat-insulating structure of the swirl chamber in accordance with the present invention can be produced in the following manner, for example.

First of all, the swirl chamber block 4 is produced by use of a ceramic material which is highly resistant to thermal shock, such as silicon nitride ($Si_3N_4$), silicon carbide (SiC), aluminum titanate, or the like. The swirl chamber block 4 can be produced by molding into a unitary structure of the shape of the swirl chamber block 4 and then sintering it. Alternatively, the swirl chamber block 4 is produced by splitting it into upper and lower swirl chamber blocks, sintering them and coupling them together by chemical vapor deposition, or the like. Still alternatively, the swirl chamber block 4 is molded by splitting it to right and left swirl chamber blocks, sintering them and coupling them together by chemical vapor deposition, or the like. The swirl chamber block 4 can be produced in the manner described above. As to the shape of the outer peripheral surface 4E of the jet port formation portions 17 of the swirl chamber block 4, it may be formed in a straight form but preferably, it is formed in the tapered form as shown in the drawing so as to somewhat reduce the diameter. When the shape of the outer peripheral surface 4E of the jet port formation portions 17 of the swirl chamber block 4 is shaped in the tapered form, the contact area of the outer block 6 coming into contact with the swirl chamber block 4 becomes greater and the residual compressive stress occurring in the swirl chamber block 4 can be applied effectively.

Next, machining is made to the necessary portions of the swirl chamber block 4 produced through the production steps described above so as to finish it into the final shape of the swirl chamber block 4. Then, the heat-insulating material prepared by converting ceramic powder, ceramic whiskers, etc., to a slurry is applied onto the outer periphery of the swirl chamber block 4 made of the ceramic material by chemical vapor deposition, plasma spray coating, spraying, coating, or the like, and is then dried. At this time the thickness of the heat-insulating material is reduced, or the heat-insulating material itself is not disposed, at the high temperature portion (represented by symbol A) of the swirl chamber block 4, that is, the outside of the swirl chamber block 4 on the center side of the main combustion chamber 1.

Figure 2:
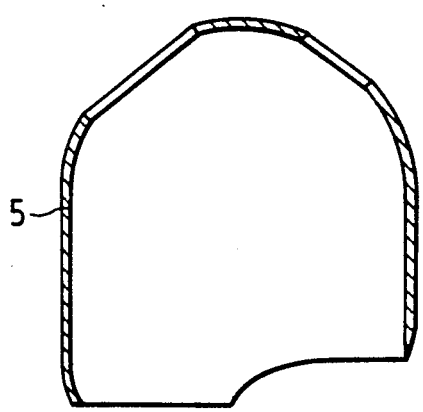
FIG. 2 is a heat-insulating layer assembled in the heat-insulating structure of the swirl chamber shown in FIG. 1.
Figure 3:
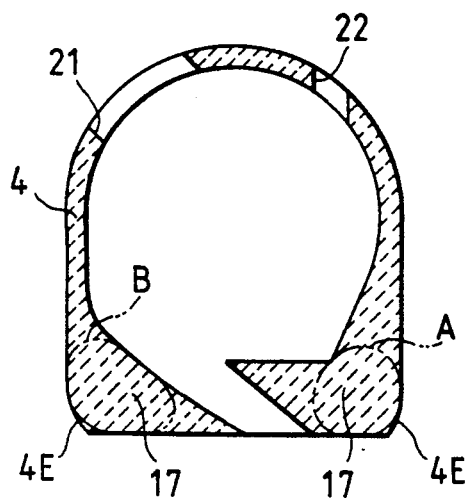
FIG. 3 is a sectional view showing the swirl chamber block assembled in the heat-insulating structure of the swirl chamber shown in FIG. 1.
Figure 4:
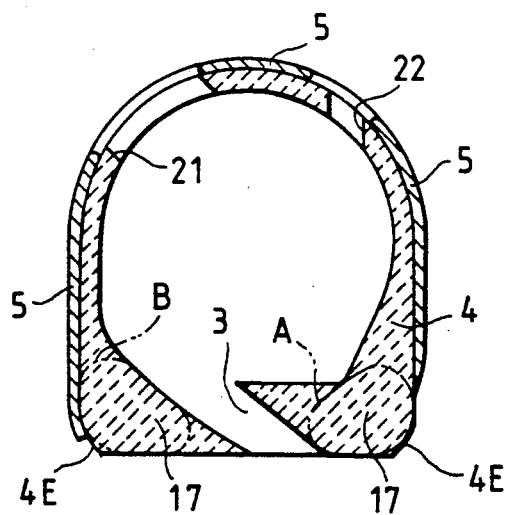
FIG. 4 is a sectional view showing the state where the heat-insulating layer and the swirl chamber block are assembled in the heat-insulating structure of the swirl chamber shown in FIG. 1.

Alternatively, the heat-insulating material of the ceramic fiber or the like is molded into the shape that fits to the outside of the swirl chamber block 4 as shown in FIG. 2. The heat-insulating layer 5 thus molded is fitted or put onto the outside of the swirl chamber block 4 shown in FIG. 3 to form a unitary structure as shown in FIG. 4. The unitary structure of the heat-insulating layer 5 and the swirl chamber block 4 is placed into a casting mold and the outer block 6 can be formed by pouring the metallic material into this casting mold. For instance, casting sand is packed to the swirl chamber 2 in the swirl chamber block 4, the jet ports 3, the fitting holes 21 of the fuel injection nozzles 8 and to the portions forming the fitting holes 22 of the glow plugs 9. The swirl chamber block 4 into which the casting sand is thus packed and the heat-insulating layer 5 are put into the casting mold such as a sand mold so as to define a cavity having the shape of the outer block 6. At this time a vent pipe is disposed in order to withdraw the gas generated from the casting sand packed into the swirl chamber block 4 to the outside is disposed. The molten metal such as Al or Fc is poured via the gate into the cavity so as to fill the cavity with the molten metal. After the molten metal constituting the outer block 6 is cooled and solidified, the swirl chamber block 4 into which the outer block 6 is casted is withdrawn from the casting mold, machining is applied to the outer block 6 to its final shape and the heat-insulating swirl chamber structure is thus complete. Finally, the outer block 6 is fitted into the hole 13 formed in the cylinder head 10 and the flange portion 19 of the outer block 6 is pushed into the inlet portion 18 of the hole 13 of the cylinder head 10 so as to fix the outer block 6 to the cylinder head 10.

The heat-insulating structure of the swirl chamber in accordance with the present invention has the structure described above and provides the following functions.

The ceramic material constituting the swirl chamber block 4 such as silicon nitride ($Si_3N_4$), silicon carbide (SiC), aluminum titanate, or the like, has high heat resistance, can withstand high temperatures and has high strength but has low resistance to tensile force. It is a material having a high heat transfer rate but has a low heat-insulating property. Since it has a high Young's modulus, it has high deformation resistance. Accordingly, if any non-uniformity occurs in the temperature distribution, high thermal stress acts on the material. The ceramic material has generally compressive strength which is by about ten times higher than the tensile strength, and has high durability against the compressive strength. Further, the thermal expansion coefficient of the ceramic material is smaller than those of metallic materials.

Accordingly, when the ceramic material is casted into the metal, the degree of contraction of the metal due to cooling of the molten metal is higher than that of the ceramic material. In other words, the compressive force is in advance provided to the swirl chamber block 4 made of the ceramic material by utilizing the dimensional change of the metal due to its contraction in order to secure the strength of the swirl chamber block 4. The thermal expansion coefficient is $3.2 \times 10^{-6}$ for silicon nitride ($Si_3N_4$) as one of the ceramic materials and is about $1 \times 10^{-6}$ for aluminum titanate, for example. In contrast, the thermal expansion coefficient is $11 \times 10^{-6}$ for the cast iron as the metallic material and is $22 \times 10^{-6}$ for aluminum. Accordingly, when the metallic material such as Fc or Al is solidified from its molten state and reaches the normal temperature, the difference of thermal shrinkage of about 1/10 occurs between it and the ceramic material. The compressive force corresponding to this difference of thermal shrinkage occurs in the metallic material and this metallic material provides the residual compressive stress to the ceramic material.

Figure 5:
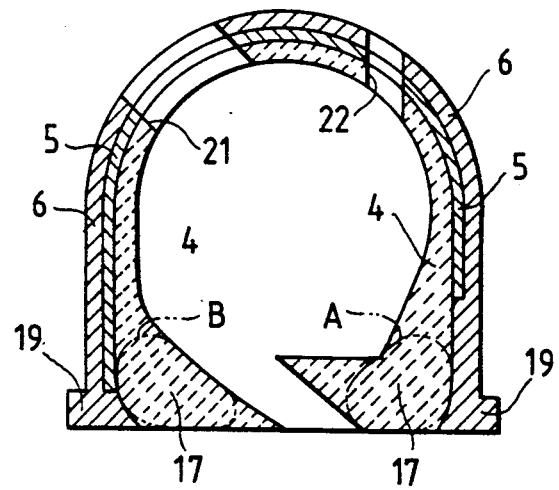
FIG. 5 is a sectional view showing part of the heat-insulating structure of the swirl chamber in accordance with another embodiment of the present invention.

In the case of the swirl chamber 2 having the heat-insulating structure, for example, the jet port portions of the swirl chamber block 4 having the jet ports 3 reach a higher temperature than the other portions and among the jet port portions, the jet portion A on the center side of the main combustion chamber 1 attains a higher temperature than the jet port portion B spaced apart from the main combustion chamber 1. Accordingly, great thermal stress and mechanical stress act on the jet port portion A of the swirl chamber block 4 and this portion becomes the portion on which severer strength is imposed. Therefore, the heat-insulating layer 5 is disposed at portions other than the jet port portion A outside the swirl chamber block 4 and the thickness of the heat-insulating layer 5 at the jet port portion A is made relatively smaller as shown in FIG. 1 or the heat-insulating layer 5 itself is not disposed as shown in FIG. 5 so as to reduce the heat-insulating degree of the jet port portion A much more than at the other portions. In this manner the heat is not accumulated at the jet port portion A of the swirl chamber block 4 but is dissipated from the jet port portion A to the cylinder head 10, lest the temperature of the jet port portion A of the swirl chamber block 4 rises excessively. The temperature difference between the jet port portion A of the swirl chamber block 4 and the jet port portion B can thus be made small and the thermal stress occurring in the swirl chamber block 4 can be reduced, so that the temperature of the swirl chamber block as a whole can be controlled to have a uniform temperature distribution. In other words, the temperature distribution of the swirl chamber block 4 made of the ceramic material can be controlled freely by adjusting the set value of the thickness or the location of the heat-insulating layer 5 disposed outside the swirl chamber block 4.

When the metal is casted into the unitary structure of the swirl chamber block 4 and the heat-insulating layer 5, the compressive force occurs in the casting metal of the outer block 6 because of the difference of the degrees of shrinkage between the metallic material and the ceramic materials at the time of cooling of the metal because the metallic material has a higher degree of contraction than the ceramic material, and the residual compressive force is applied to the swirl chamber block 4. The compressive force of the outer block 6 can be made greater for the jet port portion A of the swirl chamber block 4 at the time of casting of the metal than for the other portions and the strength of the swirl chamber block 4 can thus be secured.

Alternatively, the heat-insulating layer disposed between the swirl chamber block 4 and the outer block 6 functions as the stress mitigation layer if the heat-insulating layer 5 is produced by the porous ceramic material. Therefore, the compressive force occurring in the casting metal can be reduced by increasing the thickness of the heat-insulating layer 5 or reducing its density at the portion where the compressive force acts excessively and locally on the outer block 6, so as to control the compressive force caused by shrinkage at the time of cooling of the casting metal of the outer block 6. It is of course important to control the residual compressive stress applied to the swirl chamber block 4 by optimally selecting the set value of the thickness of the heat-insulating layer 5, its density and its location in order to control the compressive force of the swirl chamber block 4 and the outer block 6 as a whole.

What is claimed is:

1. In an internal combustion engine including a cylinder block having formed therein cylinders, a cylinder head fixed to said cylinder block and equipped with hole portions formed in such a manner as to correspond to said cylinders for forming swirl chambers and main combustion chambers formed inside said cylinders of said cylinder block, a heat-insulating structure of a swirl chamber comprising:
- swirl chamber blocks having formed therein said swirl chambers and jet ports for establishing communication between said swirl chambers and said main combustion chambers;
- heat-insulating layers made of a ceramic material and disposed on the outer surface of said swirl chamber blocks, said heat-insulating layers reducing the heat-insulating degree by said heat-insulating layers at high temperature portions of said swirl chambers much more than at low temperature portions thereof; and
- outer blocks made of a metal and fixed by casting in such a manner as to cover the outer surfaces of said heat-insulating layers and the outer surfaces of said swirl chamber blocks where said heat-insulating layers do not exist, said outer blocks being fixed to said hole portions formed in said cylinder head.

2. A heat-insulating structure of a swirl chamber according to claim 1, wherein said ceramic material forming said swirl chamber block is silicon nitride.

3. A heat-insulating structure of a swirl chamber according to claim 1, wherein that portion of said swirl chamber where temperature distribution provides an excessively high temperature portion is the formation portion of said jet port on the center side of said main combustion chamber, and said heat-insulating layer is not disposed between said swirl chamber block and said outer block at this portion.

4. A heat-insulating structure of a swirl chamber according to claim 1, wherein the degree of heat-insulation of said swirl chamber can be changed by adjusting the thickness of said heat-insulating layer.

5. A heat-insulating structure of a swirl chamber according to claim 4, wherein that portion of said swirl chamber where temperature distribution provides an excessively high temperature portion is the formation portion of said jet port on the center side of said main combustion chamber, and the thickness of said heat-insulating layer between said swirl chamber block and said outer block is reduced at this portion.

6. A heat-insulating structure of a swirl chamber according to claim 1, wherein the degree of heat-insulating of said swirl chamber can be changed by changing the density of said heat-insulating layer.

7. A heat-insulating structure of a swirl chamber according to claim 1, wherein said outer block applies a compressive force to said swirl chamber block by disposing said outer block by casting a molten metal material to said swirl chamber block either directly or indirectly through said heat-insulating layer.

8. A heat-insulating structure of a swirl chamber according to claim 1, wherein a heat-insulating air layer is formed between said hole portion formed in said cylinder head and said outer block.

9. A heat-insulating structure of a swirl chamber according to claim 1, wherein said hole portion formed in said cylinder head has an inlet portion having a large size, a flange portion disposed on said outer block is fitted into said inlet portion and said outer block is fixed to said cylinder head.

10. In an internal combustion engine including a cylinder block having formed therein cylinders, a cylinder head fixed to said cylinder block and equipped with hole portions formed in such a manner as to correspond to said cylinders for forming swirl chambers and main combustion chambers formed inside said cylinders of said cylinder block, a heat-insulating structure of a swirl chamber comprising:
- swirl chamber blocks having formed therein said swirl chambers, jet ports for establishing communication between said swirl chambers and said main combustion chambers, fitting holes for the insertion of fuel injection nozzles for jetting fuel into said swirl chambers and fitting holes for fitting glow plugs for igniting and burning the fuel jetted into said swirl chambers;
- heat-insulating layers made of a ceramic material and disposed on the outer surface of said swirl chamber blocks, said heat-insulating layers reducing the heat-insulating degree by said heat-insulating layers at high temperature portions of said swirl chambers much more than at low temperature portions thereof; and
- outer blocks made of a metal and fixed by casting in such a manner as to cover the outer surfaces of said heat-insulating layers and the outer surfaces of said swirl chamber blocks where said heat-insulating layers do not exist, said outer blocks being fixed to said hole portions formed in said cylinder head.

* * * * *